A. E. D'HARLINGUE.
UNICYCLE.
APPLICATION FILED NOV. 20, 1915.

1,228,100.

Patented May 29, 1917.
4 SHEETS—SHEET 1.

A. E. D'HARLINGUE.
UNICYCLE.
APPLICATION FILED NOV. 20, 1915.

1,228,100.

Patented May 29, 1917.
4 SHEETS—SHEET 3.

A. E. D'HARLINGUE.
UNICYCLE.
APPLICATION FILED NOV. 20, 1915.

1,228,100.

Patented May 29, 1917.
4 SHEETS—SHEET 4.

UNITED STATES PATENT OFFICE.

ALFRED E. D'HARLINGUE, OF ST. LOUIS, MISSOURI.

UNICYCLE.

1,228,100.  Specification of Letters Patent.  Patented May 29, 1917.

Application filed November 20, 1915. Serial No. 62,529.

*To all whom it may concern:*

Be it known that I, ALFRED E. D'HAR-LINGUE, a citizen of the United States, residing at the city of St. Louis, in the State of Missouri, have invented certain new and useful Improvements in Unicycles, of which the following is a specification.

This invention relates to unicycles, and, more particularly, to motor-driven unicycles adapted for traveling at a high rate of speed and for racing.

An object of the present invention is to provide a unicycle of the character described wherein the rider is seated to the rear of and outside the unicycle wheel for the purpose of giving a relatively low gravity line to the device and for the purpose of providing for the greater safety and convenience of the rider.

Another object is to provide a unicycle having all bearings adapted to be continuously lubricated through shafts.

Other objects of this invention are to provide in a unicycle an improved spoke construction for the unicycle wheel; an inner and outer rim for said wheel; the use of a pneumatic tire mounted on said outer rim as a shock absorber and to widen the wheel base; a novel construction of chassis frame adapted to be made of material of relatively light weight; a guiding or starting and stopping wheel whereby the unicycle may be started and stopped on a curve without being thrown out of balance; double steering wheels adapted to be operated together to produce the same effect as one large steering wheel to move the tractor for steering the device; the direct control of the guiding wheel simultaneously with the movement of the tractor in steering; spring-pressed means associated with the guiding wheel and adapted for the reduction of jar or vibration to the tractor transmission; the mitered rims for rollers for reducing friction, said rollers being adapted as retaining wheels for the chassis frame; a novel construction of parts for mounting the motor whereby power is transmitted by a sprocket chain to the tractor transmission; incased transmission for keeping grease about the gears and protecting same from dust and dirt; ball bearings for the gears and shafting associated with the tractor and other parts; and a novel construction and arrangement of parts adapted for making a unicycle of the character described that will be efficient in practical operation and comparatively light in weight.

With these and other objects in view this invention consists further in the construction, arrangement, and combination of parts hereinafter more particularly set forth and pointed out in the claims.

Among the advantages of the device embodying the present invention are that it provides a unicycle wherein the driver is conveniently and safely seated in a position from which he may readily steer and control its movements, that the proper balancing of the device is readily and simply achieved, that the device may be readily started or stopped on a curve as well as on a straight course, and other advantages hereinafter stated in this specification.

In the accompanying drawings forming part of this specification wherein like numbers of reference denote like parts wherever they occur.

Figure 1:
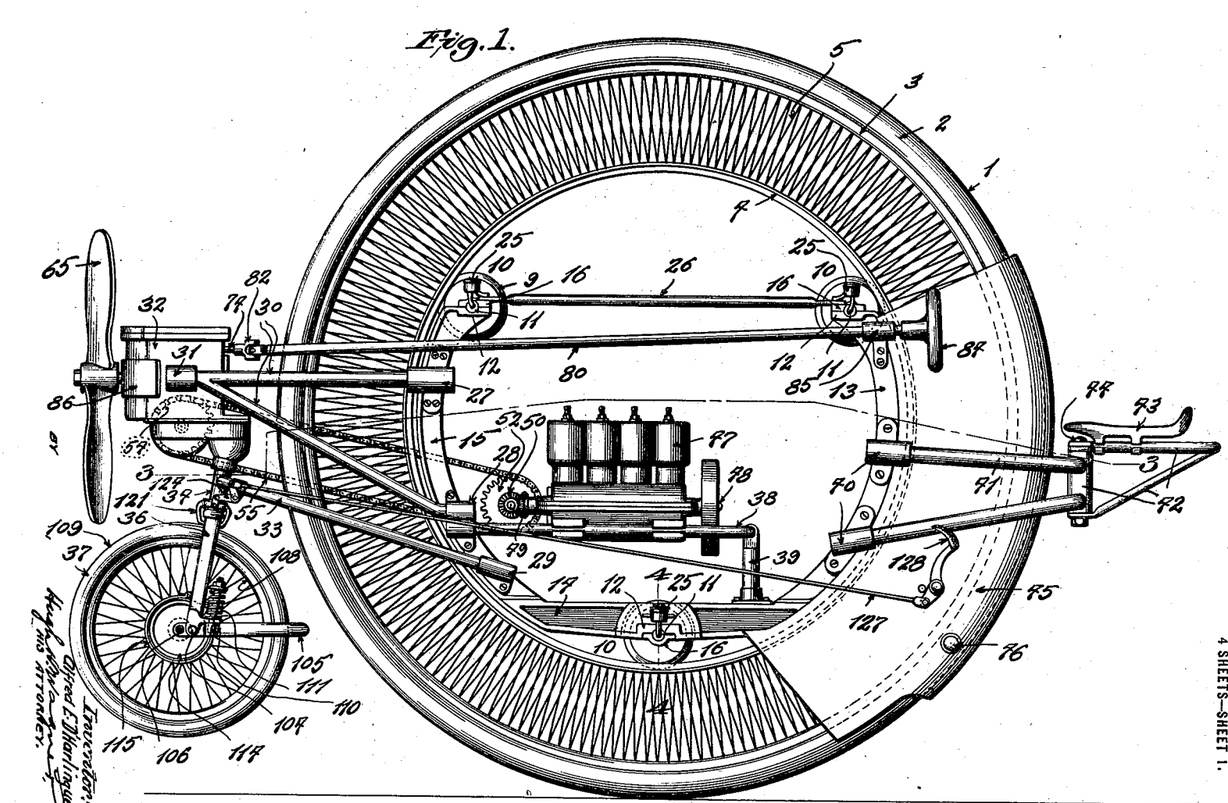
Figure 1 is a side view in elevation of a unicycle embodying the present invention.

Wheel 1 of the unicycle may be provided with treaded pneumatic tire 2 of a well-known construction, which may be mounted in the concavity of concaved outer rim 3 in a well-known manner. An inner rim 4 is provided for wheel 1, said inner rim being of channel construction and being of less diameter than outer rim 3 and is adapted to be supported in place in spaced relation with said outer rim with the channel of said inner rim facing toward the center of the wheel by means of a plurality of spokes 5, each spoke having its head supported in appropriate holes in outer rim 3, which holes may be counter sunk on the concave side of said outer rim, and extending thence with its base, which may be screw-threaded held adjacent inner rim 4 by means of relatively long shank nuts 6, each of said shank nuts being adapted to extend through appropriate holes therefor in inner rim 4. Spokes 5 may be of any suitable material, such, for instance, as steel and may extend from rim 3 to rim 4 in a well-known manner to give a laced appearance in a side elevation as shown in Fig. 1, said spokes being adapted to receive and equalize the weight of mechanism and the like of the unicycle to distribute the strain when the device is in operation. Tire 2 is adapted as a shock absorber for the mechanism of the device and for the rider, and, moreover, is adapted to widen the wheel base of wheel 1 giving better cohesion with the ground or the like on which wheel 1 travels and tends to prevent said wheel from sinking into said ground or the like. Rims 3 and 4, when in position as hereinabove described, are adapted each to describe a circumference around a substantially common center located at the axial center of wheel 1.

The channel 7 of inner rim 4 may be provided with mitered sides 8, which may be case hardened to prevent wear. Mitered sides 8 are adapted to retain the corrrespondingly mitered sides 9 of rollers 10, which rollers are adapted to travel along channel 8, each roller being rotatably mounted on a shaft 11, each shaft being rigidly mounted in a bearing 12, respectively on chassis parts 13, 14, and 15, there being provided a cap 16 for the ends of said shafts to hold same tightly in place in their bearings 12.

Figures 3, 4, 5, 6, 7, 8:
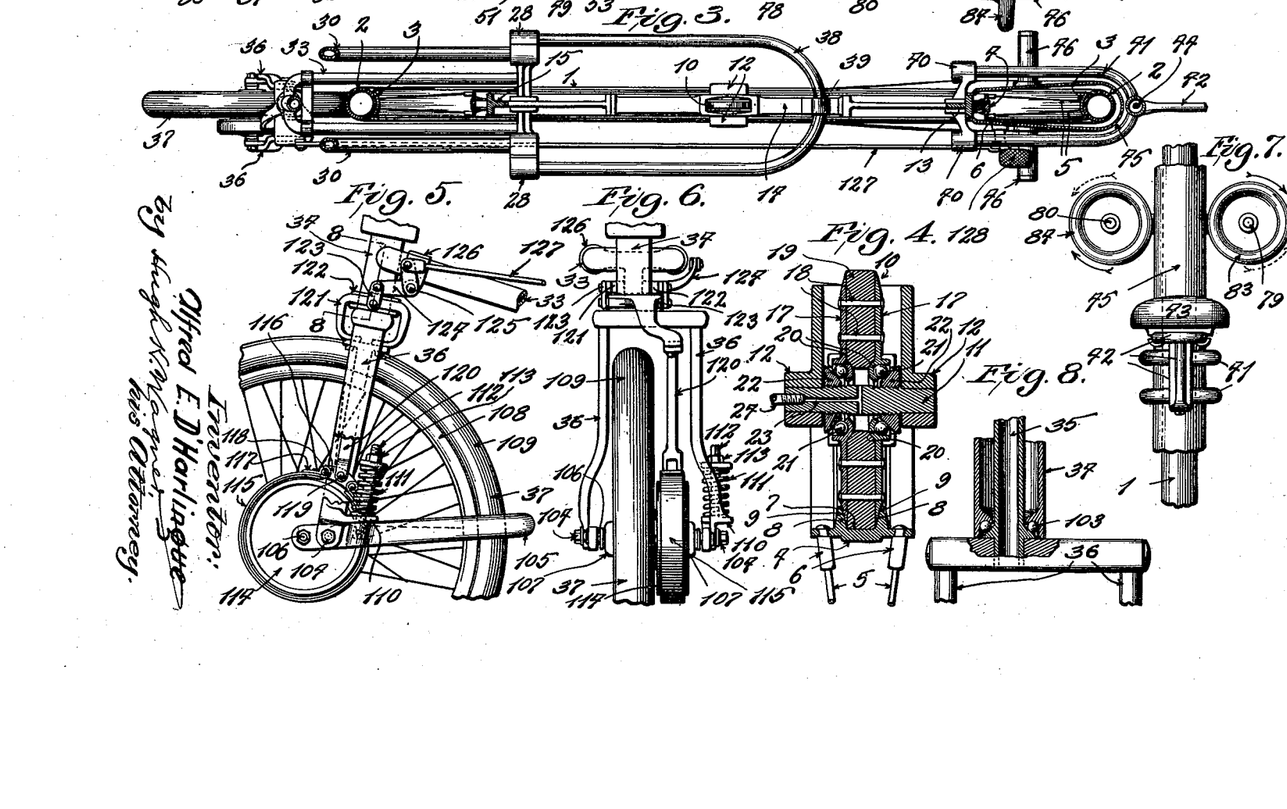
Fig. 3 is a plan view looking down upon a section on the staggered line 3—3, Fig. 1.
Fig. 4 is a cross-sectional view showing details of construction of one of the chassis-frame rollers in association with the groove of the inner rim of the unicycle wheel.
Fig. 5 is a side view in elevation of a fragment of the guiding or starting and stopping wheel and parts associated therewith showing details of the brake mechanism and the shock absorber.
Fig. 6 is a front view in elevation of Fig. 5.
Fig. 7 is a fragmentary view in elevation looking forwardly from the rider's seat and showing the double steering wheels.
Fig. 8 is a front view, partly in section, of a fragment of the fork of the guiding or starting and stopping wheel showing details of construction.

A suitable construction for rollers 10 and their axles 11 is shown in detail in Fig. 4 wherein two side plates 17 having beveled ends at 9 to form the mitered side portions of said rollers are screwed tightly by means of high pressure screws 18 with riveted ends upon a raw-hide disk 19, which disk is held and pressed firmly between said side plates. Said side plates may be of hardened steel with ball races 20 at the hub of roller 10 for balls 21 adapted to roll in said races on cones 22, which cones are screwed upon shaft 11, thus providing ball-bearings for said rollers rotatably mounted on said shafts. A grease channel 23 may be provided in each shaft 11, said channel being adapted to communicate outwardly from said ball bearings, the outward opening of said channel being adapted to receive the end of a grease supply pipe 24 mounted therein, said pipe communicating with a source of grease supply, such, for instance as cups 25, Fig. 1.

Chassis part 14 may be a straddle frame of substantially I-beam construction with a central web adjacent the roller 10 mounted thereon, said central portion of said part being adapted to straddle said roller 10, the two opposite ends of said chassis part being adapted to extend toward but not quite reach opposite portions of inner rim 4, said ends being appropriately curved, as shown in Fig. 1, correspondingly to the curve of said adjacent portion of said inner rim. On each end of chassis part 14, chassis parts 13 and 15 are respectively mounted, as shown in said Fig. 1, said chassis parts 13 and 15 being curved along their lengths to conform to the radius of inner rim 4, adjacent which said chassis parts are adapted to extend for such a distance that an arcual chord passing through the two rollers 10 mounted at the ends of said chassis parts, respectively, will pass above the axial center of wheel 1 when the parts are in the position shown in Fig. 1. Chassis parts 13 and 15 may be of T-frame construction, each upper end bearing a roller 10 may have a recess or straddle-portion adapted to receive said roller therein, and one or more tubes or members 26 adapted as braces may be provided having one end secured in any suitable manner to the roller-bearing end of chassis part 13 and the other end secured to the roller-bearing end of chassis part 15. In the arrangement of chassis parts 13, 14, and 15 shown in the drawings, three rollers 10 are provided mounted radially of inner rim 4 and are spaced apart substantially equidistant from each other, so that the radii passing through their axial centers substantially divide the circumference of said inner rim into three equal parts.

It is, of course, understood that no part of chassis parts 13, 14 and 15 are in contact with inner rim 4 and that rollers 10 are adapted to travel in channel 7 of said rim with mitered sides 9 of said rollers in engagement with mitered sides 8 of said channel.

Figure 2:
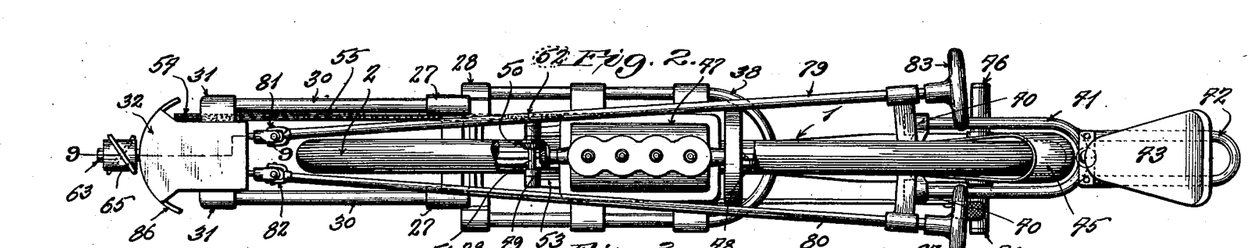
Fig. 2 is a plan view looking down upon Fig. 1, a part of the tire and the inner and outer rims being broken away better to show parts beneath same.

Brackets 27, 28, and 29 may be bolted or otherwise secured to chassis part 15 on each side thereof, brackets 27 and 28 being adapted to support the two ends of a pair of Y-shaped frame-tubes 30, the stems of said tube-frame being supported by a pair of brackets 31 secured to opposite sides of transmission casing 32, said Y-shaped frame so supported being adapted to support said transmission casing forwardly beyond wheel 1, as best seen in Figs. 1 and 2. Brackets 29 are adapted to support the bifurcated end of a substantially U-shaped frame tube 33, which is adapted to extend forwardly of wheel 1 to support casing 34, in which casing the stem 35 of fork 36 supporting auxiliary or guiding, starting, and stopping wheel 37 is mounted in advance of large wheel 1.

Brackets 28 may be double brackets and may be adapted, also, to support the bifurcated ends of a U-shaped frame 38, which frame may be a bent piece of tubing and may extend rearwardly above chassis part 14 toward chassis part 13, the rearward portion of said U-shaped frame being supported by a standard 39 borne by chassis part 14.

Two pairs of brackets 40 may be provided bolted or otherwise secured to chassis part 13, said brackets being adapted to support the bifurcated ends of U-shaped frames 41, which frames may be of tube construction, said frames being adapted to extend rearwardly of wheel 1 for supporting seat-frame 42, on the substantially horizontal portion of which seat-frame 43 is slidably mounted to the rear of and outside of wheel 1, as shown in the drawings, so that said seat may be moved toward and away from said wheel 1 on said seat-frame, king bolt 44 being adapted to secure said seat frame in place.

Guard or shield 45 may be made of any suitable material, such, for instance, as aluminum and may be secured to chassis part 13 in any suitable manner, said guard or shield being adapted to protect a rider seated on seat 43 from wheel 1. Foot rests 46, upon which the rider may place his feet, may be borne by guard or shield 45 and may extend laterally therefrom, said foot-rests being adapted, also, as braces to permit the rider in seat 43 to slide said seat.

Upon U-shaped frame 38, motor 47 may be mounted and secured in any suitable manner. Motor 47 may be of any suitable construction and character, the well-known four cylinder gasolene engine with its rotatable drive shaft 48 lying in the direction of the length of the unicycle, as shown in the drawings, being only by way of illustration. Upon the end of drive shaft 48 is rigidly mounted miter wheel 49 adapted operatively to engage the gear of miter wheel 50, said miter wheel 50 being rigidly mounted on axle 51 of sprocket wheel 52, which sprocket wheel is, also, rigidly mounted on axle 51, said axle being rotatably mounted in bearings 53 secured in position in any suitable manner, such, for instance, as by means secured to the casing of motor 47. A second sprocket wheel 54 is mounted outside of transmission casing 32 and adjacent the bottom thereof and a sprocket chain 55 operatively connects sprocket wheels 54 and 52. Sprocket wheel 54 is rigidly mounted on one end of axle 56, said axle being mounted in bearing 57 in casing 32 and having its other end adapted to extend into the interior of said casing on which end bevel gear 58 is rigidly mounted, there being preferably a ball-bearing (not shown) associated with said interior end of axle 56. Bevel gear 58 is adapted to mesh with the under gearing of a double bevel gear 59, said double bevel gear being adapted to rotate about the adjacent end of the cross of a T-shaped shaft bearing 60, there being ball-bearing 61 provided for said double bevel gear. The upper gearing of said double bevel gear is adapted to mesh with bevel gear 62, which is rigidly mounted on an end of tractor shaft 63, said shaft being rotatably mounted in the shank of T-shaped shaft bearing 60 and adapted to extend outwardly therethrough and through opening 64 in casing 32, the outwardly extended end-portion of said shaft 63 having tractor 65 rigidly secured thereto, there being a ball bearing for gear 62 at 66 and a ball bearing for shaft 63 at 67, both of said ball-bearings being inside of casing 32.

By means of the transmission mechanism just described, tractor is driven to rotate as drive shaft 48 rotates.

Figure 12:
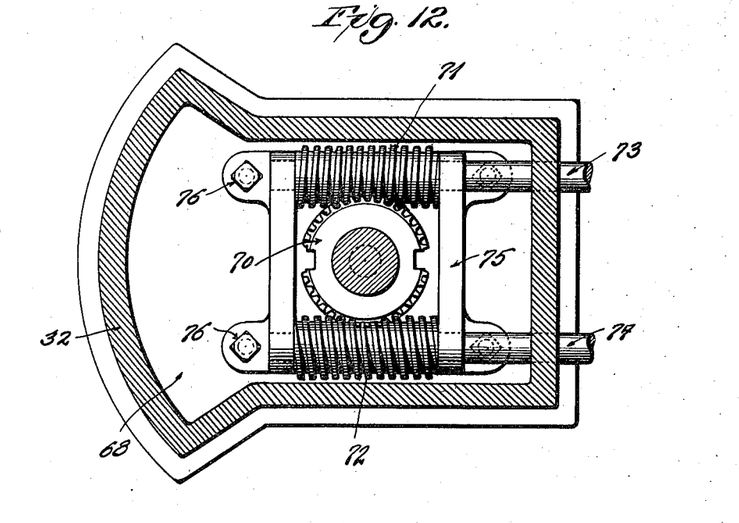
Fig. 12 is a plan view looking upwardly at a section on the line 12—12, Fig. 9.
Figure 13:
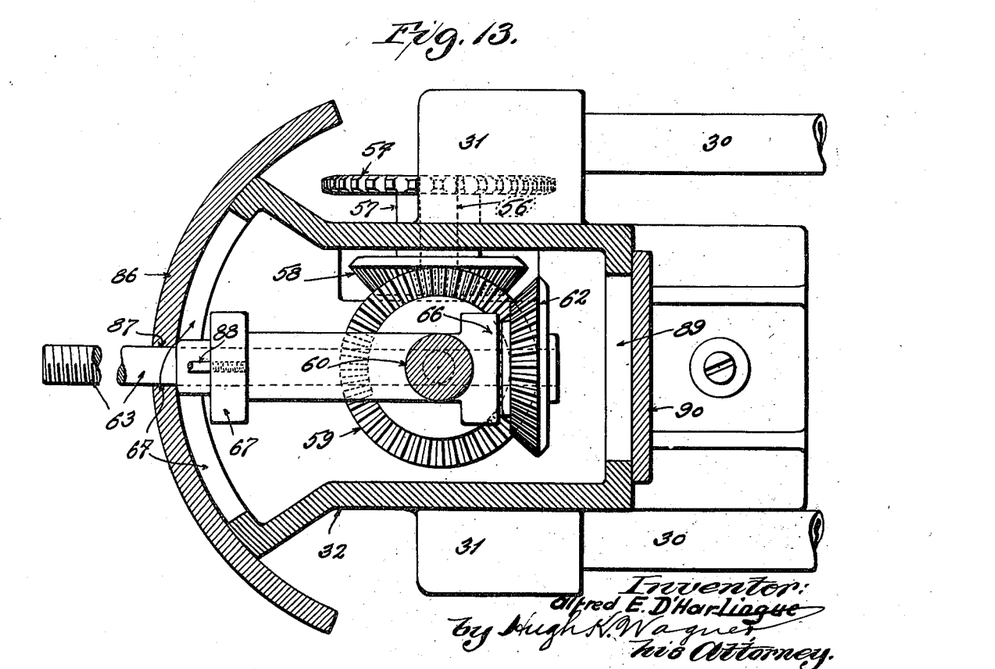
Fig. 13 is a plan view of a section on the line 13—13, Fig. 9.

The cross of T-shaped shaft bearing 60 has its end adjacent to top-cover 68 of casing 32 provided with a ball bearing 69 to facilitate the axial turning of right and left sector 70 rigidly mounted on said cross adjacent said cover within said casing, said sector being adapted to mesh worms 71 and 72, one of which worms being adapted to mesh with the right hand gear of said sector and the other of said worms being adapted to mesh with the left hand gear of said sector, each of said worms being rigidly mounted on worm-shafts 73 and 74, respectively, which worm shafts are rotatably mounted in bearing brackets 75, said brackets being secured to casing-top 68 by any suitable means, such, for instance, as by means of bolts 76. Worm shafts 73 and 74 are adapted to extend outwardly of casing 32 through appropriate bearings 77 and 78, respectively, in said casing the outer ends of said worm shafts being connected to corresponding ends of a pair of steering posts 79 and 80 by means of universal joints 81 and 82, respectively, the other ends of said steering posts being adapted to extend rearwardly and have mounted thereon a pair of steering wheels 83 and 84 within convenient reach of the driver seated on seat 43, there being a bracket 85 secured to opposite sides of chassis part 13, each of said brackets being adapted to support a portion of one of said steering posts adjacent said steering wheels, one of said steering wheels being located on one side of unicycle wheel 1 and the other steering wheel being located on the opposite side of said unicycle wheel, as best seen in Fig. 2. The mechanism described in this paragraph constitutes the steering means for swinging tractor shaft 63 to the right and left to guide the unicycle running on the one wheel 1. It will be observed that the forward part of casing 32 has flared sides and a curved front, as best seen in Figs. 2, 12, and 13, and that opening 64 in the front end is an elongated arcual opening adapted to extend almost across said front of said casing, the width of this opening being adapted to the space required for the parts therein, as best seen in Fig. 8, and the length of said opening being sufficient for arcual swing of shaft 63 as same is moved to and fro in steering the unicycle. A curved plate 86 is slidably mounted outside said opening 64 in grooves 86ª or the like, there being a central opening 87 in said plate adapted to permit shaft 63 to extend therethrough, said plate being secured to shaft bearing 67 by means of a plurality of bolts 88 or the like, so that said plate will slide to and fro before said opening 64 as shaft 63 is swung to and fro, plate 86 extending for a sufficient distance from each side of shaft 63 so that at no time will opening 64 be uncovered, thus providing that the mechanism contained within casing 32 will be protected against dirt, dust, and the like. An opening 89 at the rear of casing 32 may be provided with a removable cover 90, said opening being adapted for mounting shaft 63 in place therethrough and for giving convenient access to the interior of said casing for any purpose.

Figures 9, 10, 11:
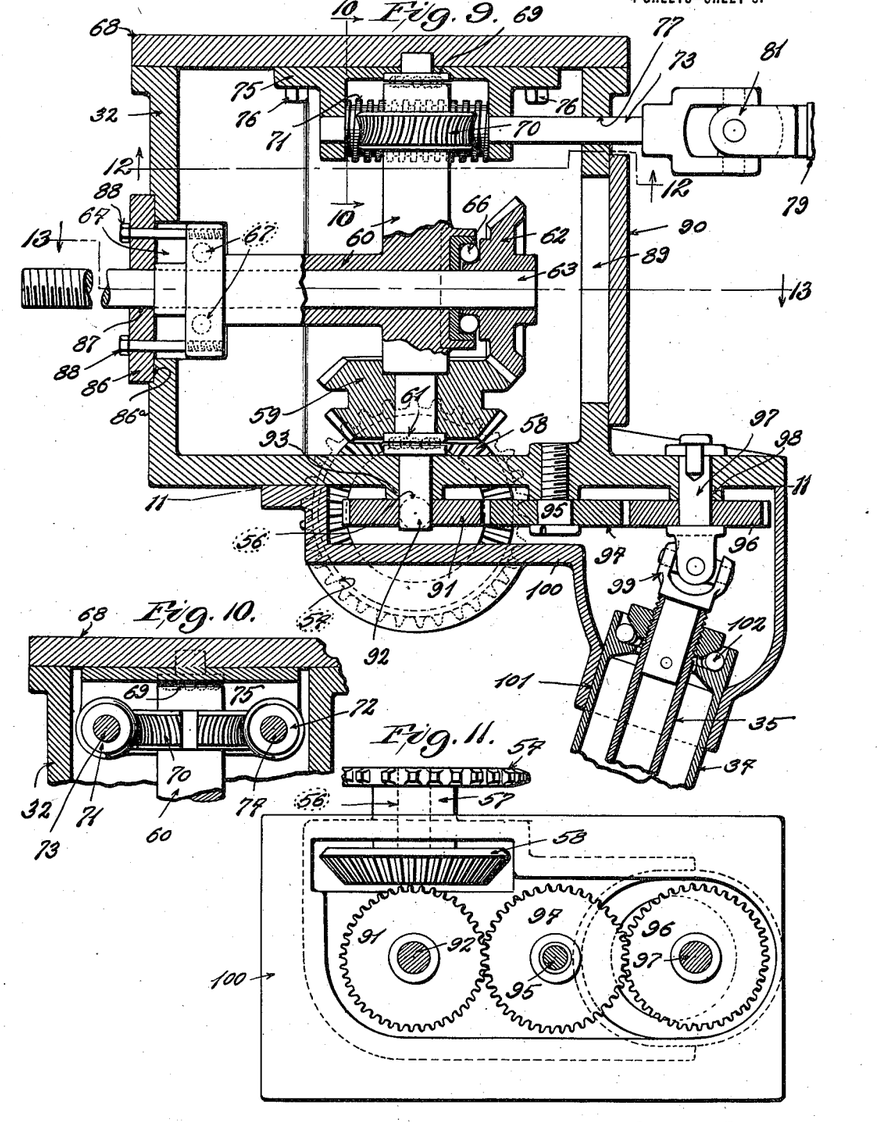
Fig. 9 is a vertical sectional view on an enlarged scale on the line 9—9, Fig. 2, showing the gearing and the like in and associated with the transmission casing.
Fig. 10 is a fragmentary sectional view on an enlarged scale on the line 10—10, Fig. 9.
Fig. 11 is a plan view looking down upon a section on the line 11—11, Fig. 9.

In order to provide that the auxiliary wheel 37 and its fork 36 may turn or be swung by means of manipulating steering wheels 83 and 84 simultaneously and similarly with the swinging of tractor shaft 63, a gear wheel 91 is rigidly mounted on shaft 92, said shaft being rigidly borne by the adjacent portion of the cross of T-shaped shaft bearing 60 and being adapted to turn as worms 71 and 72 operate sector 70 to turn the portion of the cross of said T-shaped bearing on which said sector is mounted. Shaft 92 is adapted to extend outwardly of the bottom of casing 32 operatively through an appropriate bearing 93 borne by said bottom, gear wheel 91 being rigidly mounted on the outwardly protruding portion of said shaft below said bottom of said casing, as above stated. Gear wheel 91 is adapted to mesh with a second gear wheel 94, which is rotatably mounted on rigid shaft 95, said shaft being rigidly borne by the bottom of casing 32 in any suitable manner, such, for instance, as by means of being screwed into an appropriate opening therefor in said bottom, as clearly shown in Fig. 9. Gear wheel 94 is adapted to mesh with a third gear wheel 96, which is rigidly mounted on rotatable shaft 97, said shaft being rotatably mounted in any suitable manner in an appropriate bearing 98 therefor, said bearing being adapted to extend rearwardly of casing 32 and to be borne thereby, as best seen in Fig. 9. By means of this train of gear wheels 91, 94, and 96, shaft 97 will be caused to rotate as shaft 92 is rotated and in the same direction therewith. Shaft 97 is adapted to extend below gear 96, which extension is connected to the adjacent end of fork stem 35 by means of universal joint 99, which stem bearing fork 36 of auxiliary wheel 37, said fork and wheel are moved by means of manipulating steering wheels 83 and 84 correspondingly with the movement of tractor shaft 63 and 65 in steering the unicycle. A casing 100 may be provided, said casing being borne by the bottom of casing 32 and being adapted to inclose the gear wheels and parts associated therewith mounted below said bottom, casing 100 being provided with an opening 101, in which one end of tubular casing 34 is rigidly mounted, said tubular casing being adapted to extend slightly inwardly of casing 100, as shown in Fig. 9, and being adapted to have its other end extend to the cross piece of fork 36, fork stem 35 being mounted in said tubular casing and being adapted to extend therethrough, there being ball bearings 103 (see Figs. 8 and 9) for said fork stem in said tubular casing adjacent each end, respectively, of said tubular casing.

The ends of the prongs of fork 36 are fastened at 104 by any suitable means, such, for instance, as the bolts or the like shown in the drawings, to the opposite side pieces of straddle frame 105, said frame being adapted to extend rearwardly of said fastening around auxiliary wheel 37 and having its ends adapted to extend forwardly of said fastening, on which forwardly extending end axle 106 is rigidly borne, hub 107 of wheel 37 being rototably mounted on said axle between straddle frame 105 and the prongs of fork 36. Hub 107 may be provided with ball bearing to facilitate its rotation on axle 106 by an arrangement of balls, ball races, and cones similar to that in which the hub of a roller 10 is mounted rotatably on its shaft 11 and which arrangement is clearly shown in Fig. 4 and has been hereinbefore described, and, moreover, axle 106 may be provided with a grease channel similar to grease channel 23 of shaft 11, as shown in said Fig. 4, whereby the bearings of hub 107 may be provided with means for readily lubricating the bearings.

Wheel 37 may be of a well-known wire-spoke construction, as shown in the drawings, and its rim 108 may be provided with pneumatic tire 109 mounted thereon.

A shock absorber spring bracket 110 is borne adjacent the end of one of the forks of fork 36 on which bracket rests one end of shock absorber spring 111, said spring being mounted around a tension rod 112, the other end of said spring resting against adjustable nut 113 borne by the upwardly extending screw-threaded end of said tension rod. This spring and the parts associated therewith are adapted to absorb the shock when auxiliary wheel 37 is dropped to the ground, as hereinafter described, and to absorb the vibration when said wheel is traveling on the ground in operating the device of this invention.

In the drawings, as best seen in Fig. 6, auxiliary wheel 37 has been equipped with shock absorbing means just described adjacent only one side of said wheel and it is, of course, understood, that shock absorbing means similar to that herein described and shown in the drawings may be provided adjacent the opposite side of wheel 37 or to the left of said wheel in said Fig. 6.

Brake drum 114 is rigidly secured to hub 107 by being bolted thereto or otherwise and brake band 115 is operatively mounted on said drum, there being a link 116 having its two opposite ends attached to said band by any suitable means adjacent a prong of fork 36, such, for instance, as by means of eyepieces 117 and bolts 118. Link 116 may be attached at 119 to one end of draw rod 120, the other end of said rod bearing straddling member 121, adapted to extend above the cross piece of fork 36 and having a portion adapted to engage in the groove of grooved draw collar 122, which draw collar is slidably mounted on fork stem casing 34 above the cross piece of fork 36. A pair of oppositely disposed links 123 each have one end attached to said draw collar and have their other ends attached to adjacent ends of bifurcated bell crank lever 124, said lever being pivoted at 125 to bracket 126 or the like borne by frame 33 and having its other end attached to one end of reach rod 127, the other end of said rod being operatively attached to brake pedal 128 mounted on guard or shield 45 within convenient reach of the rider seated on seat 43 so that the pressure of the rider's foot to depress said pedal will operate to apply the brake band in frictional engagement with drum 114 and thus apply the brake in a well-known manner.

The operation of the unicycle embodying the present invention may be described in the following manner:

The rider having been seated in seat 43 adjusted on its slidable adjustment in such a manner that his weight will be balanced against the parts borne by the chassis frame so that auxiliary wheel 37 will rest on the ground, whereupon the motor having been started causing tractor 65 to rotate the device will travel with wheel 1 and said auxiliary wheel both on the ground, and, as wheel 1 rotates, rollers 10 with their mitered sides in engagement with the mitered sides of the channel in rim 3 will rotate causing the chassis frame on which said rollers are mounted to remain stationary relative to the rotation of said wheel 1 and said rollers. By manipulating steering wheels 83 and 84, the rider may steer the device in any desired course and, when a desired speed of travel has been attained, the rider may shift the slidable seat rearwardly by means, for instance, of pushing with his feet against foot rest 46 until by his weight the chassis frame travels clock-wise on rollers 10 along the channel of rim 4 sufficiently to cause auxiliary wheel 37 to be raised above the ground, whereupon the device will travel on large wheel 1 only, the steering of the device running solely on said wheel 1 being accomplished by means of manipulating said steering wheels. When it is desired to stop the unicycle, the rider may shift seat 43 on its slidable mountings forwardly toward wheel 1 until auxiliary wheel drops to and travels on the ground, the jar of the shock caused by said auxiliary wheel striking the ground being absorbed by the shock absorber consisting of spring 111 and the parts associated therewith, and the motor having been stopped and the brake applied to wheel 37, the device will come to a stop. The advantage of directing the traveling course of auxiliary wheel 37 synchronously with the changing the direction of the longitudinal line of tractor shaft 63 is that auxiliary wheel 37 may be brought to the ground when the unicycle is running on a curve or on a straight course and, also, the unicycle may be started on a curve with auxiliary wheel 37 traveling on the ground and said auxiliary wheel may be elevated by the rider while the device is so traveling to continue on a curve.

By the arrangement of parts herein described wherein a pair of opposite steering wheels 83 and 84 are provided, the rider may with one hand on one of said wheels and with the other hand on the other wheel, control the steering of the device in a manner similar to that in which steering is controlled by means of one large steering wheel, which an operator may manipulate by placing one hand opposite the other on same.

Many changes in the details of construc-

I claim:

1. The combination with a wheel of a frame movable therein, a driving tractor for said wheel controlled by the weight of the rider, and means whereby the weight of the rider may be readily shifted for rendering said driving tractor inoperative.

2. The combination with a wheel of a frame movable therein, a driving tractor for said wheel controlled by the weight of the rider, and means movable in a rectilineal direction with respect to said wheel whereby the weight of the rider may be readily shifted for rendering said driving tractor inoperative.

3. The combination with a wheel of a frame movable therein, a driving tractor for said wheel, and movable means supporting the weight of the driver whereby said driving tractor is controlled by the shifting of the weight of the rider together with said means.

4. The combination with a wheel of a frame movable therein, a driving tractor for said wheel, and a seat for the rider movable rearwardly thereof whereby when said seat with the weight of the rider is shifted rearwardly said driving tractor is rendered inoperative.

5. The combination with a wheel of a frame movable therein, a driving tractor for said wheel, and a seat for the rider, said driving tractor being adapted to be rendered inoperative by the shifting of the said seat with the rider thereon.

6. The combination with a wheel of a frame movable therein, a driving wheel in advance of said first-mentioned wheel, and a movable seat for the rider whereby the shifting of said seat with the weight of the rider thereon raises said driving wheel from, or lowers said driving wheel to, the ground.

7. In a unicycle, the combination of a wheel having an outer and an inner rim, means for supporting said rims in spaced relation to each other, said inner rim having a circumferential channel with mitered inner lateral walls, a chassis frame, and three rollers rotatably mounted on said chassis frame and adapted to support said frame adjacent said inner rim, said rollers being adapted rotatably to engage the mitered walls of said channel, two of said rollers being opposite each other on a chord of the circumference of said wheel above the line of a diameter of said wheel parallel to said chord when the third of said rollers is substantially vertically below the center of said circumference.

8. In a unicycle, the combination of a wheel having an outer and an inner rim, means adapted for supporting said rims in spaced relation to each other, said inner rim having a circumferential channel with mitered lateral walls, a chassis, and a plurality of rollers rotatably mounted on said chassis and adapted to support said chassis adjacent said inner rim, said rollers having mitered sides adapted rotatably to engage said mitered walls.

9. In a unicycle, a wheel having an outer rim and an inner rim, means borne by said rims adapted to support said rims in spaced relation to each other, said inner rim having an annular channel with mitered lateral walls, a chassis comprising a base and two members mounted on opposite ends thereof, and a plurality of rollers mounted on said chassis, said rollers being adapted to support said chassis adjacent said inner rim and being adapted, also, rotatably to engage said mitered walls.

10. In a unicycle, a wheel having an outer rim and an inner rim, means borne by said rims adapted for supporting said rims in spaced relation to each other, said inner rim having an annular channel with mitered lateral walls, a chassis comprising a base, two members mounted in spaced relation to each other on said base, and means borne by said members adapted for supporting same spaced apart, and a plurality of rollers mounted on said chassis, said rollers being adapted to support said chassis adjacent said inner rim and being adapted, also, rotatably to engage said mitered walls.

11. In a unicycle, a wheel having an outer rim and an inner rim, means borne by said rims adapted to support said rims in spaced relation to each other, said inner rim having an annular channel with mitered lateral walls, a chassis frame comprising a base having two opposite standards, a roller mounted on each of said standards adjacent their upper ends, and a third roller mounted on said base, said rollers being adapted to support said chassis frame adjacent said inner rim and being adapted, also, rotatably to engage said mitered walls.

12. In a unicycle, a wheel having an outer rim and an inner rim, means borne by said rims adapted to support said rims in spaced relation to each other, said inner rim having an annular channel with mitered lateral walls, a chassis frame, and a plurality of rollers borne by said chassis frame, said rollers being adapted to support said chassis frame mounted adjacent said inner rim and being adapted, also, rotatably to engage said mitered walls, each of said rollers comprising a pair of opposite plates, a resilient member borne between said plates, means for clamping said plates together with said resilient member therebetween, a hub, and an axle rigidly borne by said chassis frame, said hub being rotatably mounted on said axle.

13. In a unicycle, a wheel having an outer rim and an inner rim, means borne by said rims adapted for supporting said rims in spaced relation to each other, said inner rim having an annular channel with mitered lateral walls, a chassis frame, and a plurality of rollers borne by said chassis frame, said rollers being adapted to support said chassis frame mounted adjacent said inner rim and being adapted, also, rotatably to engage said mitered walls, each of said rollers comprising a pair of opposite lateral plates, a resilient member between said plates, means adapted for securing said plates in position with said resilient member held pressed therebetween, a hub, an axle rigidly borne by said chassis frame, said hub being rotatably mounted on said axle, and anti-friction means adapted to facilitate the rotation of said hub on said axle.

14. In a unicycle, a wheel having an inner rim and an outer rim, means borne by said rims adapted for supporting said rims in spaced relation to each other, said inner rim having an annular channel with mitered lateral walls, a chassis frame, and a plurality of rollers borne by said chassis frame, said rollers being adapted to support said chassis frame mounted adjacent said inner rim and being adapted, also, rotatably to engage said mitered walls, each of said rollers comprising a pair of opposite lateral plates, a resilient member between said plates, means adapted for securing said plates in position with said resilient member held pressed therebetween, a hub, an axle rigidly borne by said chassis frame, said hub being rotatably mounted on said axle, and anti-friction bearings adapted to facilitate the rotation of said hub on said axle, said bearing comprising ball races borne by said hub, bearing cones borne by said axle adjacent said ball races, and bearing balls operatively mounted in said races and adapted to bear rotatably upon said bearing cones, said axle having an outwardly opening duct communicating inwardly with said anti-friction bearings for conveying lubricating means to said bearings.

15. In a unicycle, a wheel having an inner rim and an outer rim, means adapted for holding said rims spaced apart, said inner rim having an annular channel with mitered lateral walls, a chassis frame and a plurality of rollers borne by said chassis frame, said rollers being adapted to support said chassis frame mounted adjacent said inner rim and being adapted, also, rotatably to engage said mitered walls, said rollers having mitered sides adjacent their peripheries.

16. In a unicycle, a wheel having an inner rim and an outer rim, means for supporting said rims in spaced relation to each other, a chassis frame adapted to be mounted adjacent said inner rim, means borne by said chassis frame adapted to support said chassis frame in relatively stationary position when said wheel rotates, said means being in frictional engagement with said rim, a rider's seat outside of said wheel beyond its outer rim, and means borne by said chassis frame adapted to support said seat in said position.

17. In a unicycle, a wheel, and a motor-driven tractor mounted in advance of said wheel and adapted for causing said wheel to travel rotatably.

18. In a unicycle, a running wheel, a chassis mounted in said wheel, a motor mounted on said chassis, a transmission casing mounted in advance of said wheel, means borne by said chassis adapted for supporting said casing in position, a shaft rotatably mounted in said casing and having one end adapted to extend forwardly therethrough, a tractor rigidly mounted on said forward extension of said shaft, and mechanism adapted for operatively connecting said motor and said shaft for driving the latter.

19. In a unicycle having a wheel adapted as a running wheel for traveling along the ground, a chassis mounted in said wheel, a motor mounted on said chassis, a transmission casing mounted in front of said wheel, means borne by said chassis adapted for supporting said casing rigidly in place, a shaft rotatably mounted in said casing and having an end adapted to extend forwardly therethrough, a tractor rigidly mounted on said end of the shaft, and mechanism adapted for operatively connecting said motor and said shaft for driving the latter, said mechanism comprising a driven sprocket wheel adjacent said motor, a second sprocket wheel mounted outside of said casing, and a sprocket chain operatively mounted on said two sprocket wheels for driving said second sprocket wheel.

20. In a unicycle, a wheel adapted as a running wheel for the device, a chassis mounted in said wheel, a motor mounted on said chassis, a casing for transmission mechanism mounted in front of said wheel, means borne by said chassis for supporting said casing in place, a shaft rotatably mounted in said casing and having one end adapted to extend forwardly therethrough, a tractor rigidly mounted on said end of the shaft, and mechanism adapted for operatively connecting said motor and said shaft for driving the latter, said mechanism comprising a driven sprocket wheel adjacent said motor, a second sprocket wheel mounted outside of and adjacent said casing, a sprocket chain mounted on said two sprocket wheels for driving said second sprocket wheel, and a train of gears within said casing driven from said second sprocket wheel for driving said shaft.

21. In a unicycle, a wheel adapted as a running wheel for the device, a chassis mounted in said wheel, a motor mounted on said chassis, a casing for transmission mechanism mounted in front of said wheel, means borne by said chassis for supporting said casing in place, said casing having an opening through its front side, a cruciform shaft bearing having its cross-piece pivotally mounted in said casing, the shank of said cruciform bearing being adapted to extend toward said front opening of said transmission casing, a shaft rotatably mounted in the shank of said cruciform bearing and being adapted to extend rearwardly through said shank and forwardly through said opening in said transmission casing, a tractor rigidly mounted on said forward end of said shaft, and means adapted for rocking said cruciform bearing in its pivotal bearings.

22. In a unicycle, a wheel adapted as a running wheel for the device, a chassis mounted in said wheel, a motor mounted on said chassis, a casing for transmission mechanism mounted in front of said wheel, said casing having an opening in its front, means borne by said chassis for supporting said casing in place, a bearing pivotally supported in said casing, a shaft rotatably supported in said bearing and adapted to have an end extended outwardly of said casing through said opening, a tractor rigidly mounted on said outwardly extending end of the shaft, transmission mechanism adapted to connect said shaft operatively with said motor for driving said shaft, and means for rocking said bearing on its pivotal supports.

23. In a unicycle, a wheel adapted as a running wheel for the device, a chassis mounted in said wheel, a motor mounted on said chassis, a rider's seat mounted to the rear of said wheel, means borne by said chassis for supporting said seat in place, a casing for transmission mechanism mounted in front of said wheel, means borne by said chassis for supporting said casing in place, said casing having an opening in its front, a bearing pivotally mounted in said casing, a shaft rotatably mounted in said bearing and having an end adapted to extend outwardly through said opening, a tractor rigidly mounted on said outwardly extending end of the shaft, mechanism adapted operatively to connect said shaft and said motor for driving said shaft, and means for rocking said bearing in its pivotal mounting, said means being adapted to be operated from adjacent said driver's seat.

24. In a unicycle, a wheel adapted as a running wheel for the device, a chassis mounted in said wheel, a motor mounted on said chassis, a rider's seat mounted to the rear of said wheel, a casing for transmission mechanism mounted in front of said wheel, said casing having an opening in its front, a bearing pivotally supported in said casing, a shaft rotatably mounted in said bearing, said shaft having an end adapted to extend outwardly of said casing through said opening, a tractor rigidly mounted on said end of the shaft, means adapted operatively to connect said motor with said shaft for driving the latter, and means adapted for rocking said bearing on its pivotal support, said means comprising gearing operatively connected with said bearing, and means for operating said gearing from within convenient reach of the rider's seat.

25. In a unicycle, a wheel adapted as a running wheel for the device, a chassis mounted in said wheel, a motor mounted on said chassis, a rider's seat mounted to the rear of said wheel, a casing for transmission mechanism mounted in front of said wheel, said casing having an opening in its front, a bearing pivotally mounted in said casing, a shaft rotatably mounted in said bearing and having one end adapted to extend outwardly of said casing through said opening, a tractor rigidly mounted on said end of the shaft, mechanism adapted operatively to connect said motor and said shaft for driving the latter, and mechanism adapted to be operated from said rider's seat for rocking said bearing on its pivotal mounting, said last-named mechanism comprising a right and left sector borne by said bearing, a pair of worm gears mounted adjacent said sector and adapted to engage the right and left portion, respectively, of said sector, a pair of steering wheels mounted adjacent opposite sides of said running wheel within convenient reach of said rider's seat, and means adapted operatively to connect each of said worm gears with a corresponding one of said steering wheels.

26. In a unicycle, a wheel adapted as a running wheel for the device, a chassis mounted in said wheel, a motor mounted on said chassis, a casing for transmission mechanism mounted in front of said wheel, said casing having an opening in its front, a bearing pivotally supported in said casing, a shaft rotatably mounted in said bearing and having an end adapted to extend outwardly of said casing through said opening, a tractor rigidly mounted on said end of the shaft, mechanism adapted operatively to connect said motor and said shaft for driving the latter, means for rocking said bearing in its pivotal supports to swing said shaft for arcually swinging said tractor, and a cover mounted slidably over said opening and borne by said shaft, said cover being adapted to slide as said shaft is swung and to form a continuous cover for said opening.

27. In a unicycle, a wheel adapted as a running wheel for the device, said wheel having an inner rim and an outer rim fixed in spaced relation to each other, a chassis frame mounted adjacent said inner rim, means borne by said chassis and adapted to engage said inner rim for supporting said chassis substantially stationary against the rotation of said wheel, said means being adapted, also, to permit said chassis to be rocked clock-wise and counter clock-wise arcually of said wheel, an auxiliary wheel mounted in front of said running wheel, means borne by said chassis frame adapted for supporting said auxiliary wheel in front of said running wheel, a rider's seat slidably mounted in the rear of said running wheel, and means borne by said chassis adapted to support the mounting of said seat, said auxiliary wheel being adapted to be lifted from and dropped to the ground as said chassis frame is rocked clock-wise and the reverse as the rider shifts his weight in sliding said seat back and forth on its mounting.

28. In a unicycle, a wheel adapted as a running wheel for the device, said wheel having an outer rim and an inner rim fixed in spaced relation to each other, a chassis frame mounted adjacent said inner rim, means borne by said chassis frame and adapted to engage said inner rim for supporting said chassis frame substantially stationary against the rotation of said wheel, said means being adapted, also, to permit said chassis frame to be rocked clock-wise and counter clock-wise arcually of said wheel, an auxiliary wheel mounted in front of said running wheel, said mounting comprising a frame and an axle for said auxiliary wheel mounted thereon, means borne by said chassis frame and the frame of said auxiliary wheel for supporting said auxiliary wheel in position in front of said running wheel, said auxiliary wheel being adapted to be raised from and dropped to the ground as said chassis frame is rocked clock-wise and the reverse, and spring pressed means borne by the frame of said auxiliary wheel and adapted to absorb the shock as said auxiliary wheel is dropped to the ground.

29. In a unicycle, a wheel adapted as a running wheel for the device, said wheel having an outer rim and an inner rim fixed in spaced relation to each other, a chassis frame mounted adjacent said inner rim, means borne by said chassis frame and adapted to engage said inner rim for supporting said chassis frame substantially stationary against the rotation of said wheel, said means being adapted, also, to permit said chassis frame to be rocked clock-wise and counter clock-wise arcually of said wheel, a slidably mounted rider's seat supported to the rear of said wheel, means borne by said chassis frame for supporting said seat in said position so that the shifting of the rider's weight by means of adjusting said slidable seat will rock said chassis frame arcually of said wheel, an auxiliary wheel mounted in front of said running wheel, said mounting comprising a frame and an axle for said auxiliary wheel mounted thereon, means borne by said chassis frame and said auxiliary wheel frame for supporting said auxiliary wheel in position in front of said running wheel, said auxiliary wheel being adapted to be raised from and dropped to the ground as said chassis frame is rocked clock-wise and the reverse, and brake mechanism for said auxiliary wheel adapted to be operated from the rider's seat.

30. In a unicycle, a wheel adapted as a running wheel for the device, said wheel having an outer rim and an inner rim fixed in spaced relation to each other, a chassis frame mounted adjacent the inner rim, means borne by said chassis frame and adapted to engage said inner rim for supporting said chassis frame substantially stationary against the rotation of said wheel, said means being adapted, also, to permit said chassis frame to be rocked clock-wise and counter clock-wise arcually of said wheel, a rider's seat slidably mounted to the rear of said wheel, means borne by said chassis frame adapted for supporting said seat in position to the rear of said wheel, so that the shifting of the rider's weight by means of adjusting said slidable seat will rock said chassis frame arcually of said wheel, an auxiliary wheel mounted in front of said running wheel, said mounting comprising a frame and an axle for said auxiliary wheel mounted thereon, means borne by said chassis frame and said auxiliary wheel frame for supporting said auxiliary wheel in position in front of said running wheel so that said auxiliary wheel may be raised from and dropped to the ground as said chassis frame is rocked, and brake mechanism for said auxiliary wheel adapted to be operated from the rider's seat, said mechanism comprising a drum rigidly mounted on the hub of said auxiliary wheel, a friction band mounted on said drum, and lever connections for said band adapted to be operated from a position within convenient reach of the rider's seat.

31. In a unicycle, a wheel adapted as a running wheel for the device, a chassis frame mounted in said wheel so as to be stationary relative to the rotation of said wheel and so as to be adapted to be rocked arcually of said wheel, a rider's seat slidably mounted to the rear of said wheel so that by slidably adjusting same the weight of the rider will rock said chassis frame arcually of said wheel, a motor mounted on said chassis frame, an auxiliary wheel mounted in a fork in advance of said running wheel so that said auxiliary wheel will be lifted from and dropped to the ground as said chassis frame is rocked, a casing for transmission mechanism mounted in front of said running wheel, means borne by said chassis frame for supporting said casing in place, said casing having an opening in its front, a bearing pivotally supported in said casing, a shaft rotatably mounted in said bearing and having an end adapted to extend outwardly of said casing through said opening, a tractor rigidly mounted on said end of the shaft, mechanism adapted operatively to connect said motor and said shaft for driving the latter, mechanism for rocking said bearing in its pivotal supports, said last-named mechanism being adapted to be operated from the rider's seat, and gearing adapted operatively to connect the fork of said auxiliary wheel with said bearing so that said fork will rock as said bearing is rocked.

32. A unicycle comprising a wheel adapted as a running wheel, a rider's seat slidably mounted to the rear of said wheel, an auxiliary wheel mounted in advance of said running wheel, the mounting of said auxiliary wheel including a fork frame, a bearing pivotally mounted in advance of said running wheel, a tractor shaft rotatably mounted in said bearing, a tractor rigidly mounted on said shaft, motor-driven mechanism operatively connected with said shaft for driving the latter, and steering mechanism for the device, said steering mechanism comprising gearing for rocking said bearing in its pivotal supports, said gearing being adapted to be operated from within convenient reach of the rider's seat, and gearing adapted operatively to connect said auxiliary wheel fork with said bearing so that said fork will rock as said bearing is rocked.

33. A unicycle comprising a wheel adapted as a running wheel for the device, a rider's seat slidably mounted to the rear of said wheel, an auxiliary wheel mounted in advance of said running wheel, the mounting of said auxiliary wheel including a fork frame, said auxiliary wheel being adapted to be raised from and dropped to the ground by adjusting said slidable seat to shift the rider's weight, a bearing pivotally mounted in advance of said running wheel, a shaft rotatably mounted in said bearing, a tractor rigidly mounted on said shaft, said tractor being adapted to cause the device to travel when said shaft is rotated, and steering mechanism for the device, said mechanism comprising a right and left sector rigidly mounted on said bearing, a pair of worm gears adapted to mesh with the right and left portions, respectively, of said sector, a pair of steering wheels mounted adjacent opposite sides of said running wheel within convenient reach of the rider's seat, means adapted for connecting each one of said steering wheels with a corresponding one of said worm gears so that the manipulation of said steering wheels will operate said worm gears to cause said sector to rock said bearing, and gearing operatively connecting said bearing with said auxiliary wheel fork to cause said fork to rock as said bearing is rocked.

34. A unicycle comprising a wheel adapted as a running wheel for the device, a rider's seat slidably mounted to the rear of said wheel, an auxiliary wheel mounted in advance of said running wheel, said auxiliary wheel being adapted to be raised from and dropped to the ground by adjusting said slidable seat to shift the weight of the rider, motor-driven mechanism for causing the device to travel mounted in advance of said running wheel, mechanism adapted for steering the device mounted in advance of said running wheel, means adapted for operating said steering mechanism from within convenient reach of the rider's seat, said means including a pair of steering wheels mounted adjacent opposite sides of said running wheel within convenient reach from the rider's seat, and a guard-shield mounted about a portion of said running wheel adjacent the rider's seat and adapted to protect the rider from said running wheel.

35. In a unicycle, a wheel, and a motor-driven tractor adapted to engage the ground in advance of said wheel and adapted for causing said wheel to travel rotatably.

In testimony whereof I hereunto affix my signature.

ALFRED E. D'HARLINGUE.